UNITED STATES PATENT OFFICE.

RICHARD CLARK, OF CHICAGO, ILLINOIS.

IMPROVED HAIR-CURLING FLUID.

Specification forming part of Letters Patent No. 54,115, dated April 24, 1866.

*To all whom it may concern:*

Be it known that I, RICHARD CLARK, of Chicago, in the county of Cook and State of Illinois, have invented a new and useful Improved Hair-Curling Preparation or Fluid; and I do hereby declare and make known that the following is a full, clear, and exact description thereof, sufficient to enable those skilled in the art to compound and use the same.

My said invention consists in a simple vegetable compound or fluid preparation, which, on being properly applied to the hair will cause the same to curl in the most beautiful and luxuriant manner, while at the same time it is perfectly free from any substance injurious to the hair or scalp, and leaves the same clean and free from any gummy or waxy matters whatever.

To enable those skilled in the art to understand how to compound, prepare, and use my invention, I will now proceed to describe the same with particularity.

I take four ounces of distilled rain-water or any pure soft water free from mineral substances, and two ounces of alcohol, and mix the same together, and then add and thoroughly mix in one ounce of the extract of box-wood, and boil the whole down to four ounces. When cool a suitable quantity of any desired perfume may be added, when the compound is bottled and ready for use. If preferred, the alcohol may be added after the water and extract of box-wood have been boiled together, a less quantity being required in such case, the object of the alcohol being simply to preserve the preparation from souring and keep it in good condition.

The curling properties of the fluid are derived from the extract of box-wood, and its efficacy depends upon the proportion of said ingredient used, as the above-mentioned proportions may be varied and still the result be substantially the same, more of the fluid being required where the amount of the said extract of box-wood is diminished, and less where the amount of said extract is increased.

The mode of applying this fluid to the hair is as follows:

The hair is first moistened or partially saturated with the preparation and then rolled up in papers, and as soon as the hair becomes dry the papers may be removed, and the desired result is accomplished.

Instead of the extract of box-wood the tincture or other decoction of said wood may be employed with like results.

Having described my invention, I will now specify what I claim and desire to secure by Letters Patent:

In the manufacture of a hair-dressing preparation, the employment of the extract or tincture or other decoction of box-wood, substantially as specified, and for the purposes set forth.

RICHARD CLARK.

Witnesses:
W. E. MARRS,
C. ROWLAND.